United States Patent [19]

Greene

[11] 4,040,976

[45] Aug. 9, 1977

[54] PROCESS OF TREATING CARBONACEOUS MATERIAL WITH CARBON DIOXIDE

[75] Inventor: Marvin Greene, Somerset, N.J.

[73] Assignee: Cities Service Company, Tulsa, Okla.

[21] Appl. No.: 702,544

[22] Filed: July 6, 1976

[51] Int. Cl.$^2$ ............................ C01B 2/14; C01J 3/00
[52] U.S. Cl. ................................. 252/373; 423/415 A
[58] Field of Search ..................... 252/373; 423/415 A

[56] References Cited

U.S. PATENT DOCUMENTS

| 1,163,922 | 12/1915 | Hillhouse | 423/415 A |
| 2,128,262 | 8/1938 | Newman | 423/415 A |

*Primary Examiner*—Howard T. Mars
*Attorney, Agent, or Firm*—George L. Rushton

[57] ABSTRACT

A mixture of carbon dioxide and a carbonaceous material, such as coal, is rapidly heated in a reactor, giving a gaseous effluent comprising carbon monoxide. If hydrogen is added with the feed stream, a CO—$H_2$ mixture is produced.

5 Claims, 1 Drawing Figure

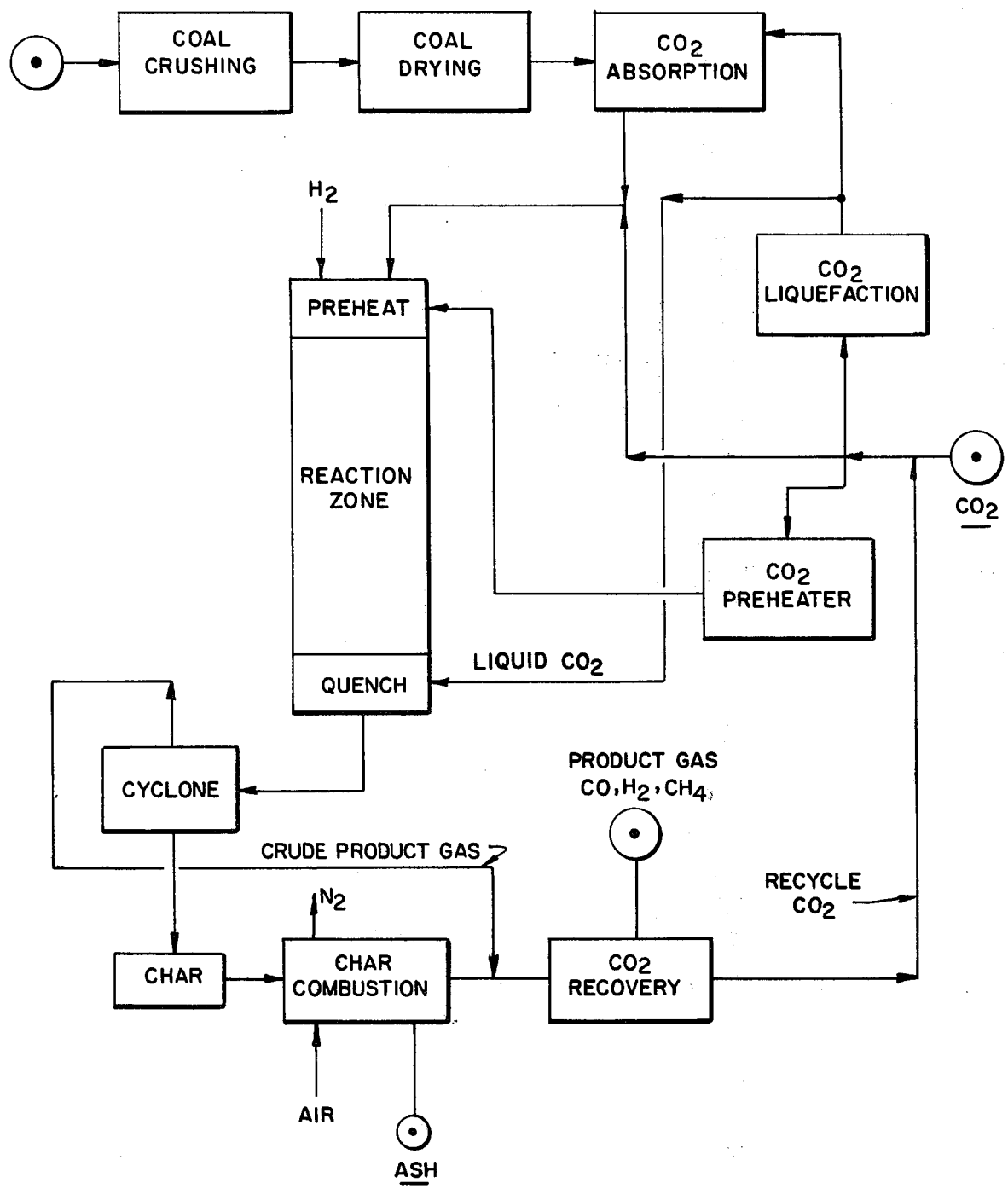

PROCESS OF TREATING CARBONACEOUS MATERIAL WITH CARBON DIOXIDE

BACKGROUND OF THE INVENTION

This invention concerns the reaction of carbonaceous material with carbon dioxide. More particularly, it concerns the non-catalytic reaction of carbonaceous material wih carbon dioxide to form a carbon monoxide-containing gas. If hydrogen is added to the reaction mixture, or if there is available hydrogen in the carbonaceous material, a synthesis gas, comprising carbon monoxide and hydrogen, is formed. The utility of the invention resides in the utilization of carbonaceous materials such as coal.

The reaction of carbon with carbon dioxide to form carbon monoxide is well known. However, in order to obtain a reasonable rate of conversion, the reaction is carried out under extreme conditions, such as high temperatures, in excess of 2500° F., or by using expensive and cumbersome catalysts.

SUMMARY OF THE INVENTION

A non-catalytic process of reacting carbonaceous material with carbon dioxide, at temperatures below 1370° C. (2500° F.) has been found, with a carbon monoxide-containing gas being the desired product. This process comprises the steps of (a) contacting the carbonaceous material with carbon dioxide, (b) adding the mixture of carbon dioxide and carbonaceous material to a reactor, (c) contacting the material mixture with hot carbon dioxide to heat the carbonaceous material in the mixture at a rate >500° C./sec. but less than about 250,000° C./sec., thus giving a preheat time of from about 0.1 to about 50 milliseconds, (d) reacting the reactor contents, and (e) quenching the reaction mixture, with the total reactor time of the reactants in the reactor varying from about 10 milliseconds to about 5000 milliseconds.

In another embodiment of the invention, a synthesis gas comprising carbon monoxide and hydrogen is formed when the carbonaceous material contains sufficient hydrogen, so that hydrogen is liberated from the carbonaceous material during the reaction with carbon dioxide. Alternatively, a stream of hydrogen can be added to the reactor so as to furnish hydrogen in the reactor effluent or to react further with intermediate reaction products to form other reaction products, such as methane.

The advantages of this process are (a) the $CO_2$ pretreatment does not result in any contamination from external sources, such as catalysts, and (b) the rapid heating results in an explosive swelling of the solid feedstock which fragments the material and exposes reaction sites on the interior surfaces, allowing additional reaction at these sites with the imbibed $CO_2$.

BRIEF DESCRIPTION OF THE DRAWING

The FIGURE schematically illustrates a preferred embodiment of the invention.

DETAILED DESCRIPTION OF THE INVENTION

Feed material for the process broadly includes carbonaceous material, exemplified by coal, lignite, humates, peat, oil shale, tar sands, charcoal, coal char, sawdust, petroleum coke or any other solid hydrocarbon-containing material. The preferred feed material is coal.

The solid feed material is crushed to a particle size of less than one inch. It is preferred that the particle size be less than about ½ inch, and the most preferred particle size is in the range of 50 to 400 mesh (U.S. Seive). The particles can be fed into the reactor in any convenient fashion. In one embodiment, the reactor is under pressure and the particles are fed from a lock hopper device into the reactor, after which they fall freely down through the vertical reactor. In another embodiment, the particles can be blown into the reactor, such as by compressed gas, at a velocity of from about 1 to 6 feet per second.

Carbon dioxide is the other reactant in the process. Gaseous or liquid $CO_2$ can be used. The reaction efficiency is improved if the carbonaceous material contacts the $CO_2$ before being introduced into the reactor. This contact, or "soaking," allows the $CO_2$ to enter the pores of the carbonaceous material, thus affording increased reaction surface. Thus, in another embodiment, the particles are slurried in liquid carbon dioxide, and the slurry is pumped into the reactor. In this case, it is efficient to form a slurry approximating a 50/50 by weight mixture of particles and carbon dioxide. Since it is contemplated that the reactor will be operating under superatmospheric pressure, it follows that any method of introducing the particles must have a pressure equal to or greater than that of the reactor pressure.

The mixture entering the reactor can have a temperature in the range of from about 2° C. (36° F.) to about 300° C. (572° F.), depending upon the method of introduction. For example, particles fed by a lock hopper system can enter at about ambient temperature, while a slurry of particles and carbon dioxide can have a temperature from about 2° C. (36° F.) up to about 31° C. (88° F.), the critical temperature of liquid carbon dioxide. The upper limit of about 300° C. is observed because of the tendency of coal particles to agglomerate at and above this temperature before they have a chance to react with the carbon dioxide.

Immediately or soon after the particles enter the reactor section, they are rapidly heated by a stream of hot carbon dioxide. This gas stream can be heated by any convenient device, such as an electrical or fuel-fired furnace. Since the operating temperature in the reactor is of the range of 535° C. (1000° F.) to about 1100° C. (2000° F.), the temperature of the carbon dioxide stream, which is the heating force, must necessarily be higher than the expected highest reaction temperature. A preferred reaction temperature is in the range of about 760° C. (1400° F.) to about 985° C. (1800° F.). Since a preferred product is a synthesis gas comprising carbon monoxide, this product can be formed by the well-known reaction between carbon and carbon dioxide to form carbon monoxide. The term "synthesis gas" is used broadly to describe a gas, or mixture of gases, which can be used in further synthetic reactions. For example, a mixture of carbon monoxide and hydrogen can be used to produce a substitute natural gas, while a specific mixture of 1 molecule of carbon monoxide and 2 molecules of hydrogen can be used in the synthesis of methyl alcohol. The present process primarily forms carbon monoxide, but if hydrogen is added with the feed particles or to the exiting gases from the reactor, a mixture of carbon monoxide and hydrogen results. Similarly, if sufficient water is added with the feed carbonaceous material, such as coal, a mixture of carbon monoxide and hydrogen is found in the effluent gas. For this reason, although the process is based on the reaction of carbon dioxide with the carbon content of the feed material to form carbon monoxide, other reactions and products are possible, depending upon the other materials that enter into the reaction.

Typically, the reaction is run under pressure, broadly from about 50 to about 3000 psig (0.35–210 kg/cm$^2$) and preferably from about 450 to about 1500 psig (31.6–105 kg/cm$^2$).

An important aspect of the process is found in the rate of heating of the feed material to reactor temperature levels. This rate of heating should exceed 500° C./sec. with an upper limit of about 250,000° C./sec. If such a heating rate is established, a catalyst is not necessary for the formation of the desired products. This elimination of a catalyst obviates the need for catalyst preparation, addition, and subsequent removal.

The mole ratio of carbon dioxide to carbon in the reaction mixture exceeds 1 and is preferably in the range of from about 3 to about 15.

The residence time or time of reaction depends upon several factors, such as the velocity with which the particle travels through the reactor, the rate of heating of the particle within the reactor, the reaction rate between the particle and the reacting gas and the path length within the reactor from inlet to outlet. Broadly, this residence time varies from about 10 to about 5000 milliseconds, preferably from about 50 to about 2000 milliseconds.

Just as a rapid heat-up of the particle is desirable for proper functioning of the process, so is a rapid quench desirable at the end of the residence or reaction time. The quench zone for the reactor is located at or near the exit of the reactor. Quenching can be accomplished in various ways, such as a spray of water or a stream of a cold gas, such as hydrogen, nitrogen or carbon dioxide. As a quench gas, it is convenient to use the same gas as is used for heating the reaction. Thus, if superheated carbon dioxide is used at or near the inlet of the reactor, it is desirable to use cooled, or liquid, carbon dioxide as the quench fluid. For best operation of the process, it is desirable to quench the temperature of the reacting materials to below the coking temperature of carbon monoxide. Preferably, it is desirable to quench in the range below about 538° C. (1000° F.). Any convenient method of introducing the quench gas can be used, such as nozzles or orifices in the circumference of the reactor at or near the exit end of the reactor.

The material exiting the reactor comprises a mixture of gases and solids. This mixture is processed by known means common in the petrochemical industry, such as by separating the solids from the gases and then fractionating the gases. Carbon monoxide, singly or in combination with other gases, is the desired product of the process and can be utilized in downstream processes.

Using the same general conditions described above for producing a CO-containing gaseous effluent, a mixture of hydrogen and carbon monoxide can be produced.

If the carbonaceous feed material contains sufficient hydrogen, some of this hydrogen can be liberated during the reaction period, resulting in a mixture of hydrogen and carbon monoxide in the gaseous effluent.

A more positive way of insuring the presence of hydrogen in the reaction effluent is to add hydrogen with the carbonaceous material-carbon dioxide feed mixture. This new mixture is then heated by the hot $CO_2$ in the reactor. Various reactions take place between the $H_2$, $CO_2$, and carbonaceous material, resulting in several products in the effluent. By adding $H_2$ at the rate of from about 0.05 to about 5.0 mole per mole of carbon dioxide, varying ratios of $H_2/CO$ are found in the effluent. Depending on the ratio, this $H_2/CO$ mixture can be used as a fuel gas or a synthesis gas, such as in the preparation of methyl alcohol.

After the $H_2$ is added to the $CO_2$-carbonaceous material feed stream, the mixture enters the reactor, is heated by the hot $CO_2$, and quenched. The effluent stream is then processed further. The residence time of the above reaction mixture is not essentially different from that of the $CO_2$-carbonaceous material mixture.

EXAMPLE I

P = 250 psig
T = 1800° F.

| Coal: | |
|---|---|
| Utah Hiawatha Seam (HvbB) | |
| ULT, wt. % MF | |
| C | 77.1 |
| H | 6.2 |
| N | 1.4 |
| S | 0.5 |
| O | 9.8 |
| Ash Balance | |

22.2% $H_2O$ in ROM Coal
25 lb. $CO_2$ fed/lb. coal
50000 SCF CO produced/ton ROM Coal (plus low molecular weight hydrocarbons, $H_2$, tars, and char)
All $CO_2$ recycled
$CO_2$ made in second reactor by combusting ½ of the CO produced in the subject reactor

| Preheat time | 10 msec. |
|---|---|
| Reaction time | 900 msec. |
| Quench time | 100 msec. |
| Total residence time | 1010 msec. |

EXAMPLE II

P = 100 psi
T = 1600° F

| Coal: | |
|---|---|
| Wyoming Glenrock (Sub B) | |
| ULT., wt. % MF | |
| C | 60.0 |
| H | 4.5 |
| N | 0.8 |
| S | 0.6 |
| O | 17.0 |
| Ash Balance | |

30 lb. $CO_2$ fed/lb. coal
37900 SCF (net) CO produced/ton MF coal (plus some low mol. wt. hydrocarbons, $H_2$, tars, and char)
All $CO_2$ recycled

| Preheat time | 20 msec. |
|---|---|
| Reaction time | 50 msec. |
| Quench time | 1500 msec. |
| Total residence time | 1570 msec. |

EXAMPLE III

P = 750 psig
T = 1500° F.

Coal:

|  | Ill. No. 6 (HvbC) ULT., wt. % MF |
|---|---|
| C | 1.2 |
| H | 4.8 |
| N | 1.4 |
| S | 2.9 |
| O | 9.6 |
|  | Ash Balance |

15.7% $H_2O$ in ROM Coal
15 lb. $CO_2$ fed/lb. coal
40800 SCF CO produced/ton ROM Coal (plus some low mol. wt. hydrocarbons, $H_2$, tars, and char)
20400 SCF $CO_2$ consumed

| Preheat time | 80 msec. |
|---|---|
| Reaction time | 80 msec. |
| Quench time | 2000 msec. |
| Total residence time | 2160 msec. |

I claim:

1. A non-catalytic process of reacting solid carbonaceous material with carbon dioxide to produce a carbon monoxide-containing gas, comprising
   a. contacting the carbonaceous material with carbon dioxide,
   b. adding the mixture of carbon dioxide and carbonaceous material to a reactor at a temperature of about 2° to about 300° C,
   c. contacting the material mixture with hot carbon dioxide to heat the carbonaceous material in the mixture at a rate greater than about 500° C./sec. but less than about 250,000° C./sec., thus giving a preheat time of from about 0.1 to about 50 milliseconds,
   d. reacting the reactor contents at a temperature of from about 535° C. to about 1100° C. and at a pressure of from about 50 to about 3000 psig, and,
   e. quenching the reaction mixture, with the total residence time of the reactants in the reactor varying from about 10 milliseconds to about 5000 milliseconds.

2. The process of claim 1, wherein
   a. the carbonaceous material is selected from the group consisting of coal, lignite, humates, peat, oil shale, charcoal, coal char, sawdust, petroleum coke, and tar sands,
   b. the $CO_2$/C mole ratio varies from about 3 to about 15, and
   e. the reaction time varies from about 50 to about 2000 milliseconds.

3. The process of claim 2, wherein
   a. the material is coal,
   b. the temperature varies from about 760° to about 985° C., and
   c. the reaction pressure varies from about 450 to about 1500 psig.

4. A non-catalytic process of making a synthesis gas mixture comprising CO and $H_2$, the steps comprising:
   a. contacting a solid carbonaceous material with a mixture of carbon dioxide and hydrogen,
   b. adding the mixture of (a) to a reactor at a temperature of about 2° to about 300° C,
   c. contacting the mixture with hot carbon dioxide to heat the carbonaceous material in the mixture at a rate greater than about 500° C./sec. but less than about 250,000° C./sec., thus giving a preheat time of from about 0.1 to about 50 milliseconds,
   d. reacting the reactor contents at a temperature of from about 535° C. to about 1100° C. and at a pressure of from about 50 to about 3000 psig, and,
   e. quenching the reaction mixture, with the total residence time of the reactants in the reactor varying from about 10 milliseconds to about 5000 milliseconds.

5. The process of claim 4, wherein
   a. the carbonaceous material is selected from the group consisting of coal, lignite, humates, peat, oil shale, charcoal, coal char, sawdust, petroleaum coke, and tar sands,
   b. the $CO_2$/C mole ratio varies from about 3 to about 15, and the $H_2$/$CO_2$ mole ratio varies from about 0.05 to about 5.0, and
   e. the reaction time varies from about 50 to about 2000 milliseconds.

* * * * *

UNITED STATES PATENT OFFICE
CERTIFICATE OF CORRECTION

Patent No. 4,040,976  Dated August 9, 1977

Inventor(s) Marvin Greene

It is certified that error appears in the above-identified patent and that said Letters Patent are hereby corrected as shown below:

Col. 1 line 9 reads     wih carbon dioxide
          should read       with carbon dioxide Col. 5 line 4 reads     1.2
          should read       71.2

Col. 5 line 30 reads   2° to about 300°C
          should read       2°C to about 300°C Col. 6 line 21 reads   2° to about 300°C
          should read       2°C to about 300°C Col. 6 line 37 reads   petroleaum
          should read       petroleum Signed and Sealed this Fourteenth Day of February 1978

[SEAL]

Attest:

RUTH C. MASON
*Attesting Officer*

LUTRELLE F. PARKER
*Acting Commissioner of Patents and Trademarks*